US012770499B2

(12) United States Patent
Mannfeld

(10) Patent No.: US 12,770,499 B2
(45) Date of Patent: Oct. 20, 2026

(54) SYSTEMS AND METHODS FOR REMOTELY ACTIVATING A WIRELESS RADIO

(71) Applicant: Carrier Corporation, Palm Beach Gardens, FL (US)

(72) Inventor: David Mannfeld, Carmel, IN (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 358 days.

(21) Appl. No.: 18/545,317

(22) Filed: Dec. 19, 2023

(65) Prior Publication Data

US 2024/0212482 A1 Jun. 27, 2024

Related U.S. Application Data

(60) Provisional application No. 63/477,120, filed on Dec. 23, 2022.

(51) Int. Cl.
*G08C 17/02* (2006.01)
*F24F 11/56* (2018.01)

(52) U.S. Cl.
CPC .............. *G08C 17/02* (2013.01); *F24F 11/56* (2018.01)

(58) Field of Classification Search
CPC ................................. G08C 17/02; F24F 11/56
USPC .......................................................... 700/276
See application file for complete search history.

(56) References Cited

U.S. PATENT DOCUMENTS 7,212,887 B2 5/2007 Shah et al.
8,740,101 B2 6/2014 Leen et al.
9,009,811 B2 4/2015 Ebrom et al.
9,594,384 B2 3/2017 Bergman et al.
9,823,672 B2 * 11/2017 McCurnin .......... G05D 23/1905
9,954,968 B2 4/2018 Wang et al.
10,523,690 B2 12/2019 Gould et al.
10,931,470 B1 2/2021 Poplawski et al.
11,193,682 B2 12/2021 Vie et al.
2005/0103874 A1 5/2005 Erdman
2006/0247826 A1 11/2006 Green et al.
2013/0261807 A1 * 10/2013 Zywicki ................... F24F 11/62 700/278
2015/0127174 A1 5/2015 Quam et al.
2017/0284691 A1 * 10/2017 Sinha ....................... F24F 11/84
2019/0044747 A1 * 2/2019 Dunn .................... H04L 12/282
2020/0036795 A1 1/2020 Brophy et al.
2021/0172636 A1 * 6/2021 Jones .................... G06F 3/0482
(Continued)

FOREIGN PATENT DOCUMENTS

WO 2020236912 A1 11/2020

*Primary Examiner* — Md Azad
(74) *Attorney, Agent, or Firm* — Souad Hakim

(57) ABSTRACT

Embodiments of the disclosure describe systems and methods for remotely modifying an operating state of a wireless radio on a first device via a second device. The system comprises a first device comprising a wireless radio, and a controller in a second device configured to communicate with the first device via a serial communication bus. The controller is configured to receive an input to trigger a change in an operating state of the wireless radio on the first device. Further, the controller is configured to transmit, via the serial communication bus, a signalling message to the first device to initiate change in the operating state of the wireless radio on the first device, wherein the first device is configured to modify the operating state of the wireless radio on the first device.

18 Claims, 6 Drawing Sheets

(56) References Cited

U.S. PATENT DOCUMENTS

| | | | | |
|---|---|---|---|---|
| 2021/0185074 | A1* | 6/2021 | Fitzgerald | H04W 4/02 |
| 2022/0252292 | A1* | 8/2022 | Vie | F24F 11/50 |

* cited by examiner

SYSTEMS AND METHODS FOR REMOTELY ACTIVATING A WIRELESS RADIO

CROSS-REFERENCE TO RELATED APPLICATIONS

This application claims priority to U.S. Provisional Patent Application No. 63/477,120, filed Dec. 23, 2022, and entitled "Systems and Methods for Remotely Activating a Wireless Radio", the disclosure of which is incorporated by reference herein in its entirety.

FIELD OF THE INVENTION

The disclosure generally relates to wireless radios, and more particularly relates to systems and methods for remotely activating a wireless radio of a heating ventilation and air conditioning (HVAC) equipment.

BACKGROUND

HVAC control systems are used to control the environment within a building and are also linked via the internet for web-enabled building control. The internet connection allows receipt of instructions from a remote and/or mobile device. Further, current HVAC equipment include wireless radios to provide a connection to mobile phones for service purposes. Specifically, current wireless solutions on HVAC equipment are hands-free where a technician can just walk up to a piece of equipment and connect to that radio. However, the wireless radios add a cybersecurity risk to the HVAC equipment.

Currently, the HVAC systems have elaborate credentialing solutions to mitigate the cybersecurity risk. Such solutions are associated with a credentialing service in the cloud where the technician downloads the credentials to their phone before trying to connect to the radio in the HVAC systems. This credentialing could be removed. However, the removal of such credentialing solutions would lead to equipment being open to on-site cyber-attacks. Additionally, these credentialing solutions are complicated and expensive to support.

Therefore, in view of the above-mentioned problems, there is a need to provide a method and system for managing and controlling the wireless radios inside the HVAC systems while minimizing the cybersecurity risk.

SUMMARY

This summary is provided to introduce a selection of concepts, in a simplified format, that are further described in the detailed description of the disclosure. This summary is neither intended to identify key or essential inventive concepts of the disclosure and nor is it intended for determining the scope of the disclosure.

Disclosed herein is a method of remotely modifying an operating state of a wireless radio on a first device is provided. The method comprises receiving, at a second device, an input to trigger a change in the operating state of the wireless radio on the first device. Further, in response to receiving the input, the method comprises transmitting, via a serial communication bus, a signalling message to the first device to initiate change in the operating state of the wireless radio on the first device.

In one or more embodiments, the first device is a Heating, Ventilation, and Air Conditioning (HVAC) device and the second device is a thermostat.

In one or more embodiments, the receiving comprises receiving, via one of a display interface of the second device or a cloud network, the input to trigger the change in the operating state of the wireless radio on the first device.

In one or more embodiments, the signalling message corresponds to switching ON the wireless radio on the first device for a predetermined time duration.

In one or more embodiments, the method may further include receiving, at the second device, another input to re-trigger the change in the operating state of the wireless radio on the first device; and in response to receiving the other input, transmitting, via the serial communication bus, another signalling message to the first device to initiate another change in the operating state of the wireless radio on the first device.

In one or more embodiments, the other signalling message corresponds to switching OFF the wireless radio on the first device.

Also disclosed herein is a method of remotely modifying an operating state of a wireless radio on a first device is provided. The method comprises receiving, via a serial communication bus, a signalling message from a second device to the first device for initiating a change in the operating state of the wireless radio on the first device. Further, the method comprises modifying, by the first device, the operating state of the wireless radio on the first device.

In one or more embodiments, the method may further include establishing a connection between the wireless radio and a third device of a user for servicing the first device.

In one or more embodiments, the method may further include modifying the operating state of the wireless radio. The modification of the operating state comprises switching ON the wireless radio. The wireless radio corresponds to one of a Bluetooth radio device or a Wi-Fi radio device.

Also disclosed herein is a system of remotely modifying an operating state of a wireless radio on a first device. The system comprises a first device comprising a wireless radio, and a second device comprising a controller. The controller is configured to communicate with the first device via a serial communication bus. The controller is further configured to receive an input to trigger a change in the operating state of the wireless radio on the first device. The controller is further configured to transmit, via the serial communication bus, a signalling message to the first device to initiate the change in the operating state of the wireless radio on the first device. The first device is configured to modify the operating state of the wireless radio on the first device.

In one or more embodiments, the controller is configured to receive, via one of a display interface of the second device or a cloud network, the input to trigger the change in the operating state of the wireless radio on the first device.

In one or more embodiments, the signalling message corresponds to switching ON the wireless radio on the first device for a predetermined time duration.

In one or more embodiments, the controller is further configured to receive another input to re-trigger change in the operating state of the wireless radio on the first device. Also, the controller, in response to receiving the other input, is configured to transmit, via the serial communication bus, another signalling message to the first device to initiate another change in the operating state of the wireless radio on the first device.

In one or more embodiments, the other signalling message corresponds to switching OFF the wireless radio on the first device.

In one or more embodiments, the wireless radio is configured to establish a connection between the first device and a third device of a user for servicing the first device, wherein the third device is a mobile communication device.

Also disclosed herein is an apparatus at a second device for remotely modifying an operating state of a wireless radio on a first device is provided. The apparatus comprises a controller in the second device configured to communicate with the first device via a serial communication bus. The controller is configured to receive, at a second device, an input to trigger a change in the operating state of the wireless radio on the first device. Further, in response to receipt of the input, the controller is configured to transmit, via the serial communication bus, a signalling message to the first device to initiate the change in the operating state of the wireless radio on the first device.

Also disclosed herein is an apparatus at a first device for remotely modifying an operating state of a wireless radio on a first device is provided. The apparatus comprises one or more processors configured to receive, via a serial communication bus, a signalling message from a second device for initiating a change in the operating state of the wireless radio on the first device. Further, the one or more processors are configured to modify the operating state of the wireless radio on the first device.

To further clarify the advantages and features of the methods, systems, and apparatuses, a more particular description of the methods, systems, and apparatuses will be rendered by reference to specific embodiments thereof, which are illustrated in the appended drawings. It is appreciated that these drawings depict only typical embodiments of the disclosure and are therefore not to be considered limiting of its scope. The disclosure will be described and explained with additional specificity and detail with the accompanying drawings.

BRIEF DESCRIPTION OF THE DRAWINGS

These and other features, aspects, and advantages of the disclosure will become better understood when the following detailed description is read with reference to the accompanying drawings in which like characters represent like parts throughout the drawings, wherein.

Figure 1:
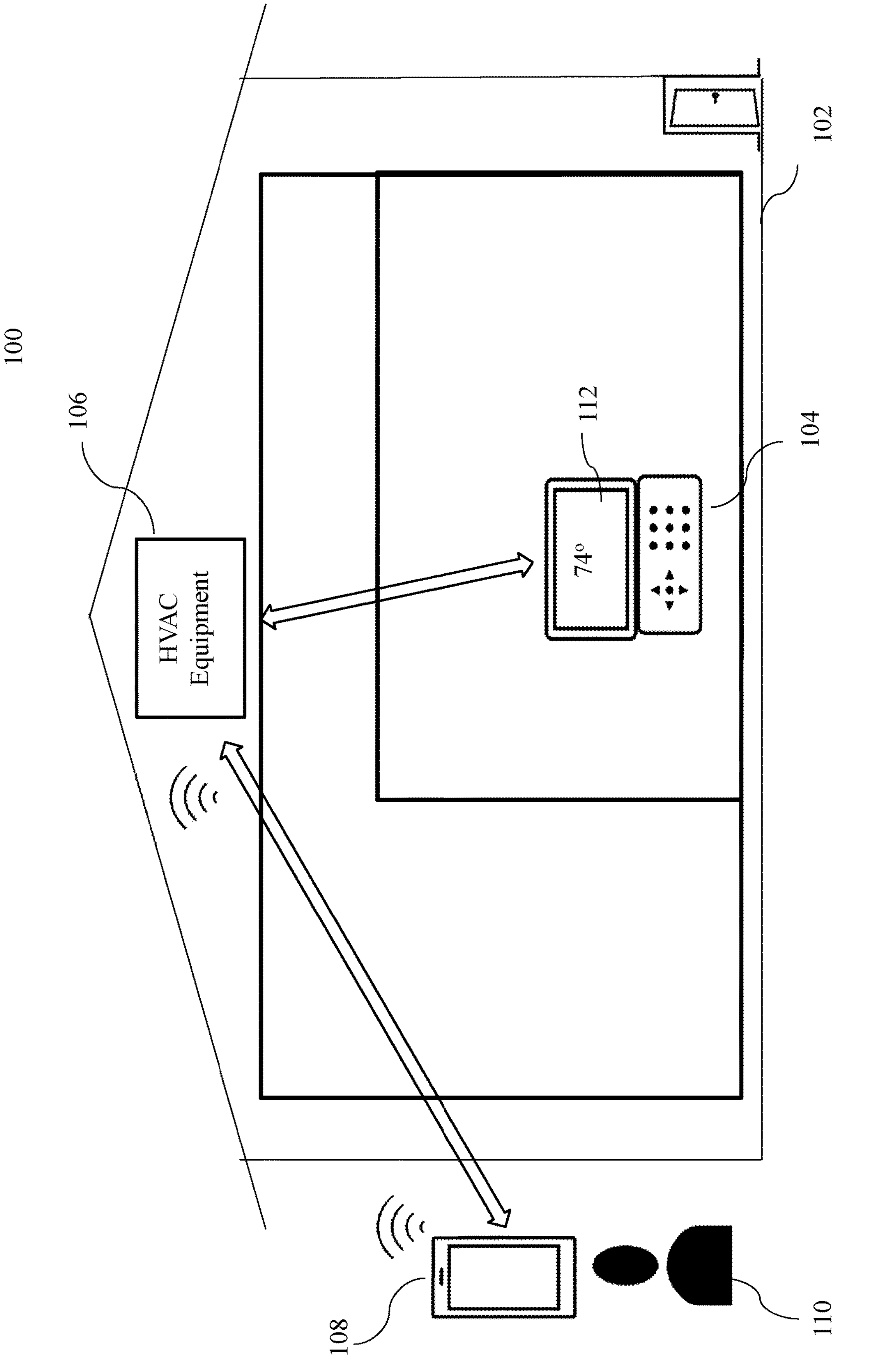
FIG. 1 illustrates an environment for remotely modifying an operating state of a wireless radio on an HVAC system/equipment, according to an embodiment of the disclosure.

Further, skilled artisans will appreciate that elements in the drawings are illustrated for simplicity and may not have necessarily been drawn to scale. For example, the flow charts illustrate the method in terms of the most prominent steps involved to help to improve understanding of aspects of the disclosure. Furthermore, in terms of the construction of the device, one or more components of the device may have been represented in the drawings by conventional symbols, and the drawings may show only those specific details that are pertinent to understanding the embodiments of the disclosure so as not to obscure the drawings with details that will be readily apparent to those of ordinary skill in the art having the benefit of the description herein.

DETAILED DESCRIPTION

For the purpose of promoting an understanding of the principles of the disclosure, reference will now be made to the various embodiments and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates.

It will be understood by those skilled in the art that the foregoing general description and the following detailed description are explanatory of the disclosure and are not intended to be restrictive thereof.

Reference throughout this specification to “an aspect”, “another aspect” or similar language means that a particular feature, structure, or characteristic described in connection with the embodiment is included in at least one embodiment of the disclosure. Thus, appearances of the phrase “in an embodiment”, “in another embodiment”, “some embodiments”, “one or more embodiments” and similar language throughout this specification may, but do not necessarily, all refer to the same embodiment.

The terms “comprises”, “comprising”, or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by “comprises . . . a” does not, without more constraints, preclude the existence of other devices or other sub-systems or other elements or other structures or other components or additional devices or additional sub-systems or additional elements or additional structures or additional components.

Embodiments of the disclosure will be described below in detail with reference to the accompanying drawings.

FIG. 1 illustrates an environment 100 for remotely modifying an operating state of a wireless radio on an HVAC system/equipment.

The environment 100 may include one or more areas 102. As a non-limiting example, the area 102 may correspond to a living room area of a house. As a non-limiting example, the environment 100 may correspond to a smart or IoT environment comprising one or more devices, such as, but not limited to, a thermostat 104 and an HVAC equipment 106, as discussed herein. Such an area is shown only for illustrative purposes, and a person skilled in the art would understand that the environment 100 may include other areas as well, without departing from the scope of the disclosure. Further, in alternative embodiments, instead of a smart home, an office environment, luxury hotels, or the like comprising one or more aforementioned devices may correspond to environment 100 or area 102.

In an embodiment, the thermostat 104 may comprise a touch display screen/interface 112 to receive one or more inputs or commands, or instructions. In particular, the thermostat 104 may be configured to receive, via the touch display screen/interface 112 of the thermostat 104, an input to trigger a change in an operating state of a wireless radio or transceiver on the HVAC equipment/device 106. The wireless radio may correspond to one of a Bluetooth radio device and a Wi-Fi radio device. Specifically, a user (e.g., a technician) 110 may access a service interface via the touch display screen/interface 112 on the thermostat 104 to select an option associated with switching ON/OFF of the wireless transceiver or the wireless radio on the HVAC equipment 106. The inputs may be associated with switching ON of the wireless radio/transceiver on the HVAC equipment 106 for a predetermined time duration. The predetermined time duration associated with the input may be pre-configured at the thermostat 104. In another embodiment, the predetermined time duration may be configured manually by the user/technician 110 each time the inputs are provided at the thermostat 104.

The thermostat 104 may be configured to communicate with the HVAC equipment 106 via a wired serial communication bus or a wireless network. Alternatively, the thermostat 104 may be configured to receive one or more inputs via another remote device connected wirelessly, such as a mobile device 108 of a user/technician 110. For example, the thermostat 104 may receive the inputs remotely via a cloud network (not shown). The inputs may be provided by the user/technician 110 from a remote location over a wireless communication network via the cloud network.

Further, in response to receiving the input(s), the thermostat 104 may be configured to transmit, via the serial communication bus, a signalling message to the HVAC equipment 106 to initiate a change in the operating state of the wireless radio on the HVAC equipment 106. for example, the signalling message may be transmitted via an RS-485 hardware layer or a 24VAC line leveraging PLC power line communications. The method of transmitting such signalling messages to the HVAC equipment/device 106 is described in detail in U.S. patent application Ser. No. 17/861,639, assigned to Carrier Corporation, which is incorporated by reference herein in its entirety.

Furthermore, the thermostat 104 may be configured to receive another input to re-trigger another change in the operating state of the wireless radio on the HVAC equipment 106. The other input may correspond to switching OFF of the wireless radio or transceiver of the HVAC equipment 106. In response to receiving the other input, the thermostat 104 may be configured to transmit, via the serial communication bus, another signalling message to the HVAC equipment 106 to initiate another change in the operating state of the wireless radio on the HVAC equipment 106. The other signalling message may be similar to the signalling message transmitted earlier to the HVAC equipment 106. The other signalling message may indicate to the HVAC equipment 106 to switch OFF the wireless radio or transceiver of the HVAC equipment 106.

The HVAC equipment 106 may be configured to receive, via the serial communication bus, the signalling message transmitted from the thermostat equipment 104 to the HVAC equipment 106 for initiating a change in the operating state of the wireless radio on the HVAC equipment 106. The operating state may correspond to whether the device is in an OFF state or an ON state. The HVAC equipment 106 may be configured to modify the operating state of the wireless radio on the HVAC equipment 106 in response to the receipt of the signalling message. In an exemplary embodiment, a default operating state of the wireless radio or transceiver may correspond to the OFF state. The default OFF state of the wireless radio may be modified to switch it ON for establishing a wireless connection to the mobile device 108 of the user/technician 110. The user/technician 110 may connect to the wireless radio of the HVAC equipment 106 for servicing the HVAC equipment 106.

The wireless radio of the HVAC equipment 106 may remain operational (i.e., switched ON) for a predefined duration of time, such as, but not limited to, 30 mins or 60 minutes. The wireless radio may remain operational or switched ON until receipt of another signalling message from the thermostat 104, in a manner similar to receipt of an initial signalling message as described above. Thus, the wireless radio is switched OFF, except during a service activity of the HVAC equipment 106.

Figure 2A:
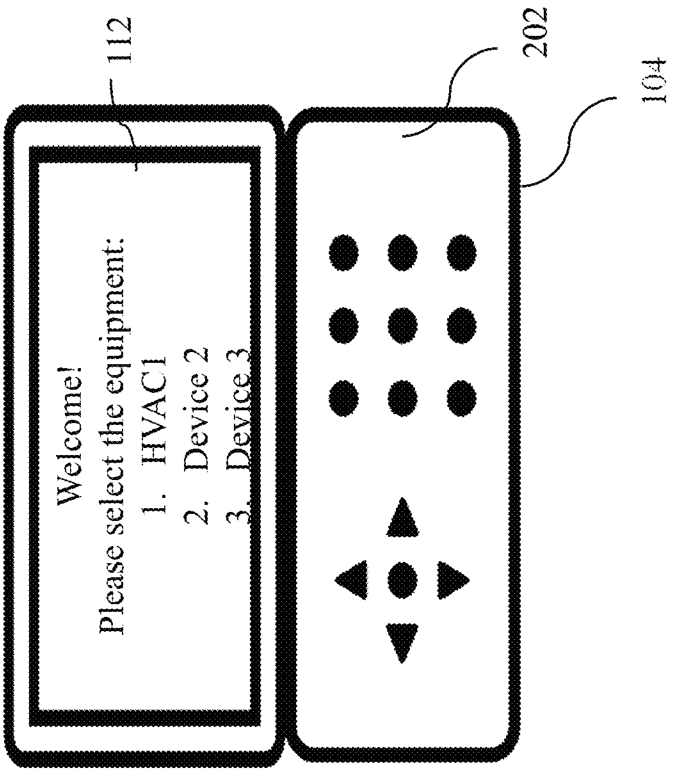
FIGS. 2A and 2B illustrate a touch display interface of the thermostat to remotely control a wireless radio of an HVAC equipment, according to an embodiment of the disclosure.
Figure 2B:
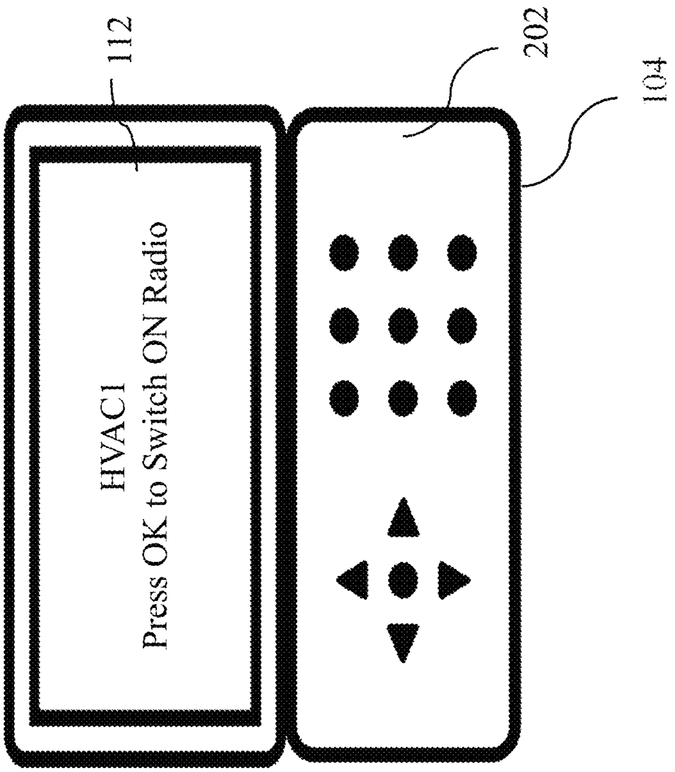

FIGS. 2A and 2B illustrate a touch display interface 112 of the thermostat 104 to remotely control a wireless radio of an HVAC equipment. Referring to FIG. 2A, the touch display interface 112 of the thermostat 104 may be enabled by a user/technician by switching it ON via a standard mechanism of operating the thermostat 104. Subsequently, an option to operate one or more connected equipment may also be provided on the touch display interface 112. As illustrated in the current example shown in FIG. 2A of the drawings, the touch display interface 112 may list three different devices to be operated via the thermostat 104, i.e., HVAC1, Device 2, and Device 3, which may be selected via a finger/pen at the touch display interface. Alternatively, the user may select one of the devices via one or more physical buttons provided on a control board 202 of the thermostat 104. The user may be able to select the device for which the operating state needs to be modified. In the current example, HVAC1 may be selected via the touch display interface 112. The HVAC1 may correspond to the HVAC equipment 106 discussed above in conjunction with FIG. 1.

Referring to FIG. 2B, the user may be provided an option to modify the operating state of the wireless radio of the HVAC equipment via the touch display interface 112 or physical buttons provided on the control board 202. As illustrated in the example shown in FIG. 2B of the drawings, the user may be provided an option to switch ON or switch OFF the radio of the selected HVAC1 equipment, which is connected to the thermostat 104 via a serial communication bus or a wireless communication network. Once the user provides an input via touch display interface 112 or physical buttons on the control board 202 to switch ON or switch OFF the radio, the thermostat 104 may process such input as a trigger to transmit a signalling message via the serial communication bus to switch ON the wireless radio of the HVAC1.

Figure 3:
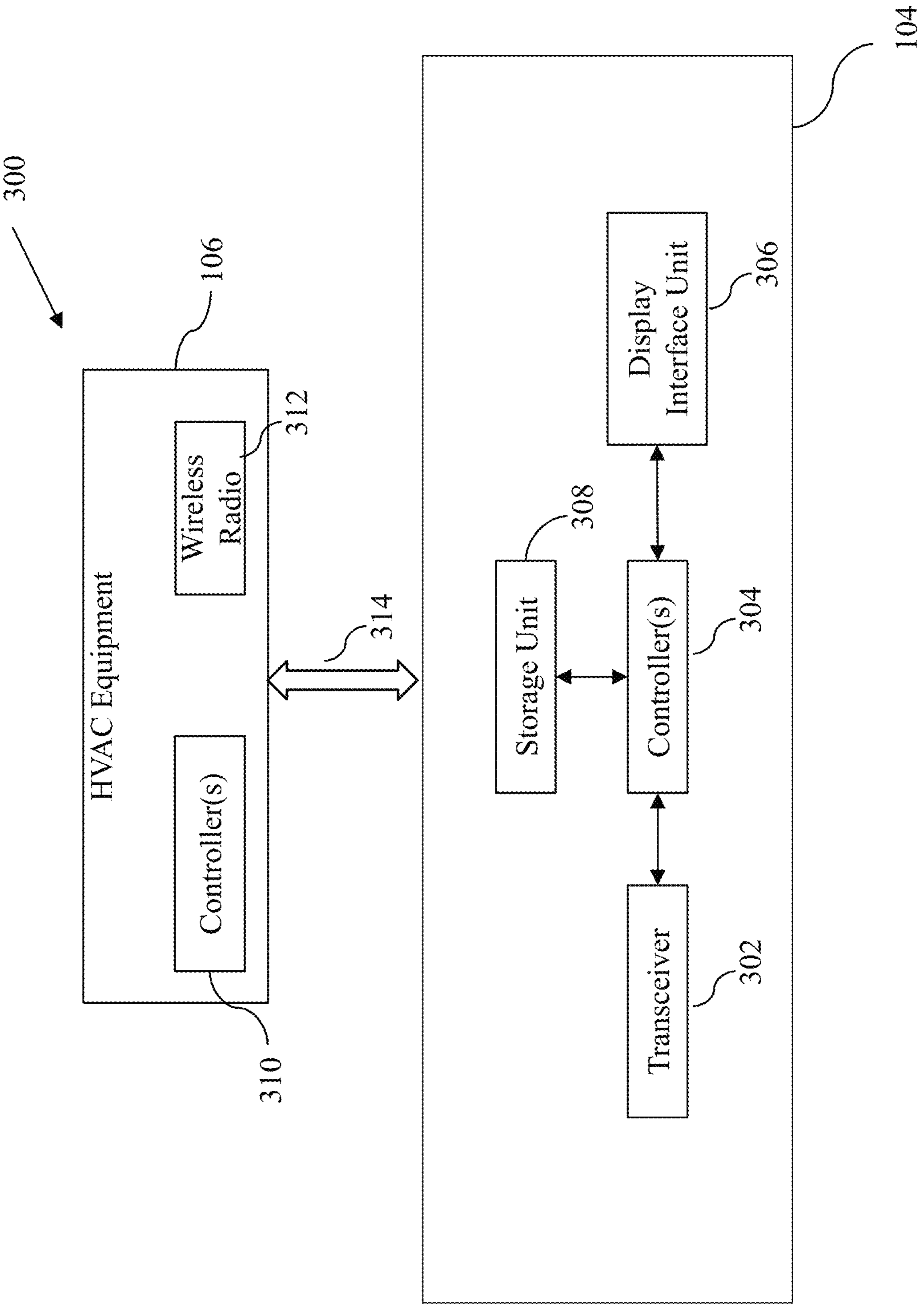
FIG. 3 illustrates a schematic block diagram of a system for remotely modifying an operating state of a wireless radio on an HVAC equipment from a thermostat, according to an embodiment of the disclosure.

FIG. 3 illustrates a schematic block diagram of a system 300 for remotely modifying an operating state of a wireless radio on an HVAC equipment 106 from a thermostat 104. As illustrated, an apparatus of the thermostat 104 may include a transceiver 302, controller(s) 304, a display interface unit 306, and a storage unit 308. Further, an apparatus of the HVAC equipment 106 may include controller(s) 310 and a wireless radio 312.

The transceiver 302 of the thermostat 104 may be configured to communicate with an external router using communication protocol for wired and/or wireless transmission and receiver functions. Further, the transceiver 302 may communicate with the controller(s) 304 to control the systems connected to the thermostat, such as HVAC equipment 106 that may control further devices such as an air conditioner, boiler, etc.

The controller(s) 304 may be configured to process the inputs received via the display interface unit 306 (e.g., touch and one or more inputs received via the transceiver 302. For example, the controller(s) 304 may receive inputs related to initiating the change in the operating state of the wireless radio of another connected device, such as the HVAC equipment 106. Further, the controller(s) 304 may be configured to send a signalling message to the HVAC equipment 106 to modify the operating state via the wired serial communication bus 314. Further, the controller(s) 304 may be configured to communicate with a storage unit 308 to store data associated with inputs. In an embodiment, the controller(s) 304 may be one or more microprocessor(s).

The storage unit 308 may store data and instructions executable by the controller(s) 304. The storage unit 308 may further include, but not limited to, a non-transitory computer-readable storage media such as various types of volatile and non-volatile storage media, including but not limited to, random access memory, read-only memory, programmable read-only memory, electrically programmable read-only memory, electrically erasable read-only memory, flash memory, magnetic tape or disk, optical media and the like. Further, the non-transitory computer-readable storage media of the storage unit 308 may include executable instructions in a form of modules and a database to store data. The modules may include a set of instructions that may be executed to cause the thermostat 104 to perform any one or more of the methods disclosed herein throughout the disclosure. Specifically, the one or more modules may be configured to perform the steps of the disclosure using the data stored in the database of the storage unit 308, to control the HVAC equipment 106 as discussed herein. The one or more modules may be a hardware unit that may be outside the storage unit 308. The storage unit 308 may communicate via a bus within the controller(s) 304.

Further, the display interface unit 306 may be configured to receive one or more inputs from a touch display screen (e.g., 112) as discussed with reference to FIG. 1 of the drawings. The display interface unit 306 may be configured to receive one or more inputs from a user/technician provided at the touch display screen using a finger, pen, etc. Additionally, the display interface unit 306 provides an output on the touch display screen for communicating with the user/technician. In an alternative embodiment, a remote device coupled to the thermostat 104 may be configured to provide inputs to the thermostat 104 via a wired or wireless mode through a similar display screen provided on such remote devices. In one example, the thermostat 104 may receive the inputs remotely via a cloud network (not shown) and be processed at the controller(s) 304. The inputs may be provided by the user/technician from a remote location over a wireless communication network via the cloud network.

The controller(s) 310 of the HVAC equipment 106 may be configured to receive a signalling message from the thermostat 104, via the serial communication bus 314. Further, in response to receipt of the signalling message from the thermostat 104, the controller(s) 310 may be configured to modify the operating state (switch ON/OFF) of the wireless radio 312 on the HVAC equipment 106, so that the HVAC equipment 106 may be remotely connected with a mobile device of the technician/user. The wireless radio 312 may be one of a Wi-Fi or a Bluetooth radio.

For the sake of brevity, the architecture and standard operations of the transceiver 302, the controller(s) 304, the display interface unit 306, the storage unit 308, the controller 310, and the wireless radio 312 are not discussed in detail.

Figure 4:
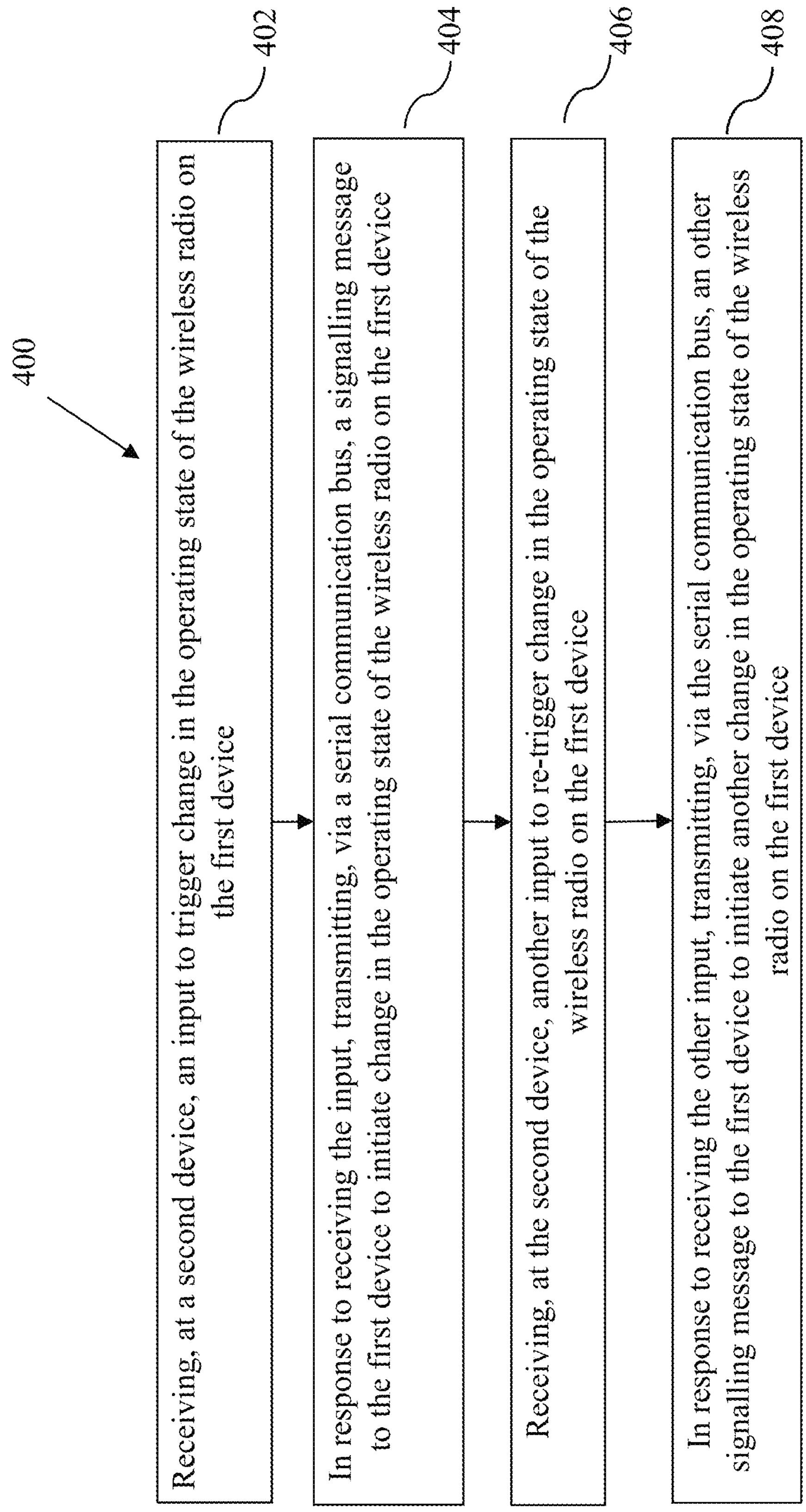
FIG. 4 illustrates a process flow depicting a method performed at a second device for remotely modifying an operating state of a wireless radio on a first device via the second device, according to an embodiment of the disclosure.

FIG. 4 illustrates a process flow depicting a method 400 performed at a second device for remotely modifying an operating state of a wireless radio on a first device via the second device. In an exemplary embodiment, the steps of the method 400 may be performed by a thermostat, i.e., the second device.

At step 402, the method 400 comprises receiving, at a second device, an input to trigger a change in the operating state of the wireless radio on the first device. The first device may be the HVAC equipment/device. In one embodiment, the receiving may comprise receiving, via one of a display interface of the second device or a cloud network, the input to trigger the change in the operating state of the wireless radio on the first device.

At step 404, the method 400 comprises transmitting, via a serial communication bus, a signalling message to the first device to initiate the change in the operating state of the wireless radio on the first device, in response to receiving the input. In an exemplary embodiment, the signalling message may correspond to switching ON of the wireless radio on the first device for a predetermined time duration.

At step 406, the method 400 comprises receiving, at the second device, another input to re-trigger the change in the operating state of the wireless radio on the first device.

At step 408, the method 400 comprises transmitting, via the serial communication bus, another signalling message to the first device to initiate another change in the operating state of the wireless radio on the first device, in response to receiving the other input. In an exemplary embodiment, the other signalling message may correspond to switching OFF of the wireless radio on the first device.

Figure 5:
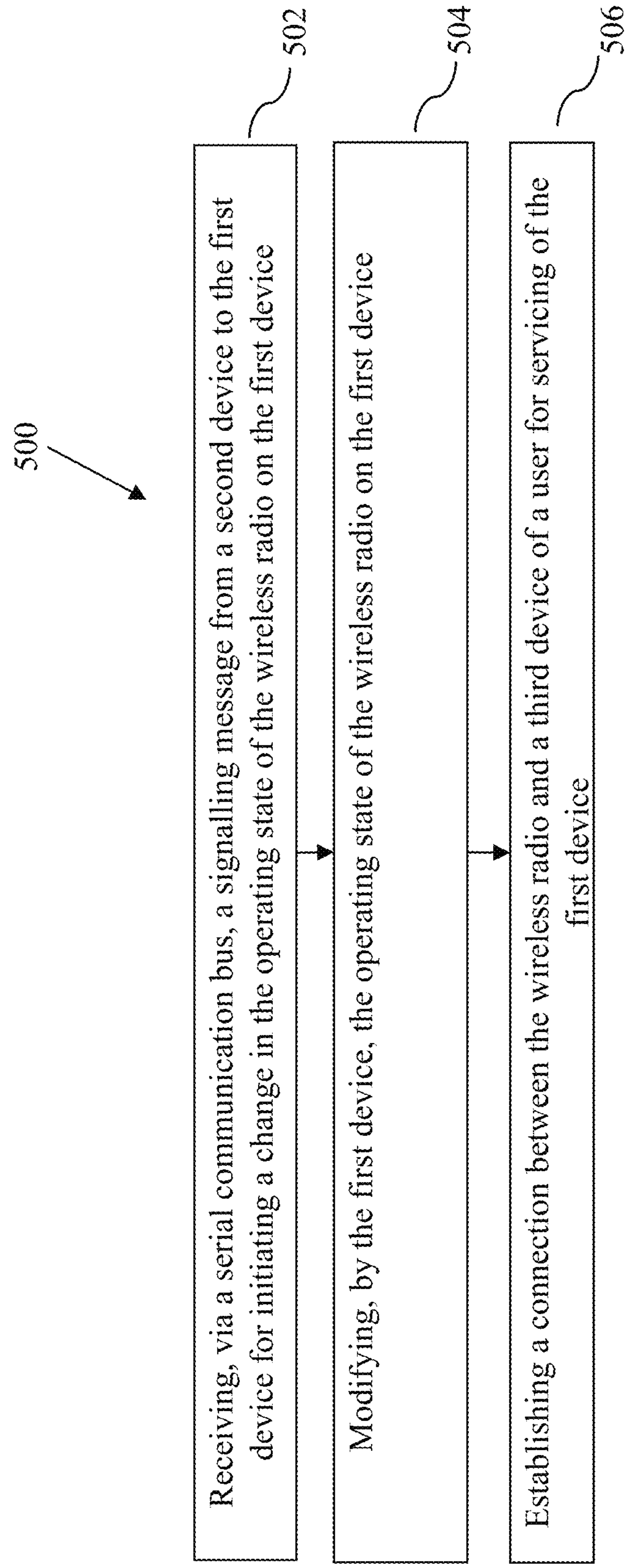
FIG. 5 illustrates a process flow depicting a method performed at a first device for remotely modifying an operating state of a wireless radio on the first device via a second device, according to an embodiment of the disclosure.

FIG. 5 illustrates a process flow depicting a method 500 performed at a first device for remotely modifying an operating state of a wireless radio on the first device via a second device. In an exemplary embodiment, the steps of the method 500 may be performed by an HVAC equipment, i.e., the first device.

At step 502, the method 500 comprises receiving, via a serial communication bus, a signalling message from a second device to the first device for initiating a change in the operating state of the wireless radio on the first device.

At step 504, the method 500 comprises modifying, by the first device, the operating state of the wireless radio on the first device. The modification in the operating state of the wireless radio comprises switching ON of the wireless radio. The wireless radio may be one of a Bluetooth radio device or a Wi-Fi radio device.

At step 506, the method 500 comprises establishing a connection between the wireless radio and a third device of a user/technician for servicing the first device.

While the above steps of FIG. 4 and FIG. 5 are described in a particular sequence, the steps may occur in variation to the sequence in accordance with one or more alternative embodiments of the disclosure.

Advantageously, the wireless radio may be temporarily enabled (i.e., switched ON) either for a predefined duration of time or until receipt of a next signalling message. Further, the HVAC equipment 106 may be serviced while the radio is switched ON, thereby minimizing the risk of any cyber-attacks as compared to conventional solutions where the radio is generally switched ON by default making it susceptible to cyber-attacks. Further, the remote enabling of the wireless radio via the wired serial communication bus facilitates in remote enabling of HVAC equipment, which may be located in far-off locations, such as an attic, terrace, or any such unreachable location of premises. Additionally, due to the switch ON timing of the wireless radio being only restricted to service activity duration, there is no need for credentialing service at the mobile device 108 of the user/technician 110.

While the embodiments discussed above relate to switching ON/OFF of a wireless radio in an HVAC equipment via a thermostat, it may be apparent to a person skilled in the art that the embodiments should not be restricted only to HVAC and thermostat equipment. Based on the features of the disclosure discussed above, an operating state of a wireless radio of one device may be controlled via another device.

While specific language has been used to describe the subject matter, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

I claim:

1. A method of remotely modifying an operating state of a wireless radio on a first device, the method comprising:

receiving, at a second device, an input to trigger a change in the operating state of the wireless radio on the first device; and in response to receiving the input, transmitting, via a serial communication bus, a signalling message to the first device to initiate change in the operating state of the wireless radio on the first device, wherein the wireless radio has a default OFF operating state, and wherein the signalling message initiates switching the wireless radio from the default OFF operating state to an ON operating state to enable servicing of the first device.

2. The method of claim 1, wherein the first device is a heating, ventilation, and air conditioning (HVAC) device and the second device is a thermostat.

3. The method of claim 1, wherein the receiving comprises receiving, via one of a display interface of the second device or a cloud network, the input to trigger the change in the operating state of the wireless radio on the first device.

4. The method of claim 1, wherein the signalling message corresponds to switching ON the wireless radio on the first device for a predetermined time duration.

5. The method of claim 1, further comprising:

receiving, at the second device, another input to re-trigger the change in the operating state of the wireless radio on the first device; and in response to receiving the other input, transmitting, via the serial communication bus, another signalling message to the first device to initiate another change in the operating state of the wireless radio on the first device.

6. The method of claim 5, wherein the other signalling message corresponds to switching OFF the wireless radio on the first device.

7. A method of remotely modifying an operating state of a wireless radio on a first device, the method comprising:

receiving, via a serial communication bus, a signalling message from a second device to the first device for initiating a change in the operating state of the wireless radio on the first device; and modifying, by the first device, the operating state of the wireless radio on the first device, wherein the wireless radio has a default OFF operating state, and wherein the modifying comprises switching the wireless radio from the default OFF operating state to an ON operating state to enable servicing of the first device.

8. The method of claim 7, further comprising:

establishing a connection between the wireless radio and a third device of a user for servicing the first device.

9. The method of claim 7, wherein the modifying the operating state of the wireless radio comprises switching ON the wireless radio, and wherein the wireless radio is one of a Bluetooth radio device or a Wi-Fi radio device.

10. A system for remotely modifying an operating state of a wireless radio on a first device, the system comprising:

a first device comprising a wireless radio; and a controller in a second device configured to communicate with the first device via a serial communication bus, wherein the controller is configured to:

receive an input to trigger a change in an operating state of the wireless radio on the first device, and transmit, via the serial communication bus, a signalling message to the first device to initiate the change in the operating state of the wireless radio on the first device, wherein the first device is configured to modify the operating state of the wireless radio on the first device, wherein the wireless radio has a default OFF operating state, and wherein the signalling message initiates switching the wireless radio from the default OFF operating state to an ON operating state to enable servicing of the first device.

11. The system of claim 10, wherein the first device is a heating, ventilation, and air conditioning (HVAC) device and the second device is a thermostat.

12. The system of claim 10, wherein the controller is configured to receive, via one of a display interface of the second device or a cloud network, the input to trigger the change in the operating state of the wireless radio on the first device.

13. The system of claim 10, wherein the signalling message corresponds to switch ON the wireless radio on the first device for a predetermined time duration.

14. The system of claim 10, wherein the controller is further configured to:

receive another input to re-trigger change in the operating state of the wireless radio on the first device; and in response to receiving the other input, transmit, via the serial communication bus, another signalling message to the first device to initiate another change in the operating state of the wireless radio on the first device.

15. The system of claim 14, wherein the other signalling message corresponds to switching OFF the wireless radio on the first device.

16. The system of claim 10, wherein the wireless radio is configured to establish a connection between the first device and a third device of a user for servicing of the first device, wherein the third device is a mobile communication device.

17. An apparatus at a second device for remotely modifying an operating state of a wireless radio on a first device, the apparatus comprising:

a controller in the second device configured to communicate with the first device via a serial communication bus, wherein the controller is configured to:

receive, at a second device, an input to trigger a change in an operating state of the wireless radio on the first device; and in response to receipt of the input, transmit, via the serial communication bus, a signalling message to the first device to initiate change in the operating state of the wireless radio on the first device, wherein the wireless radio has a default OFF operating state, and wherein the signalling message initiates switching the wireless radio from the default OFF operating state to an ON operating state to enable servicing of the first device.

18. An apparatus at a first device for remotely modifying an operating state of a wireless radio on a first device, the apparatus comprising:

one or more processors configured to:

receive, via a serial communication bus, a signalling message from a second device for initiating a change in the operating state of the wireless radio on the first device; and modify the operating state of the wireless radio on the first device, wherein the wireless radio has a default OFF operating state, and wherein the modifying comprises switching the wireless radio from the default OFF operating state to an ON operating state to enable servicing of the first device.

* * * * *